United States Patent [19]

Brennan

[11] 3,742,082
[45] June 26, 1973

[54] DIMERIZATION OF OLEFINS WITH BORON TRIFLUORIDE

[75] Inventor: James A. Brennan, Cherry Hill, N.J.

[73] Assignee: Mobil Oil Corporation, New York, N.Y.

[22] Filed: Nov. 18, 1971

[21] Appl. No.: 200,237

[52] U.S. Cl. .................. 260/683.9, 260/683.15 B
[51] Int. Cl. ............................................. C07c 3/18
[58] Field of Search .......... 260/683.14 B, 683.15 C, 260/683.9

[56] References Cited
UNITED STATES PATENTS

| | | | |
|---|---|---|---|
| 3,149,178 | 9/1964 | Hamilton et al. ............... | 260/683.9 |
| 3,576,898 | 4/1971 | Blake et al. ...................... | 260/676 |
| 2,148,116 | 2/1939 | Gerhart et al. ................. | 260/683.15 |
| 2,183,503 | 12/1939 | McAlevy ........................ | 260/683.15 |
| 2,766,312 | 10/1956 | Serniuk .......................... | 260/683.15 |
| 2,810,774 | 10/1957 | Serniuk .......................... | 260/683.15 |
| 2,816,944 | 12/1957 | Muessig et al. ................ | 260/683.15 |
| 2,976,338 | 3/1961 | Thomas .......................... | 260/683.15 |
| 3,214,486 | 10/1965 | Doyle et al. .................... | 260/676 |
| 2,552,508 | 5/1951 | Peters ............................. | 260/683.15 |

*Primary Examiner*—Paul M. Coughlan, Jr.
*Attorney*—Andrew L. Gaboriault, Oswald G. Hayes, Benjamin I. Kaufman et al.

[57] ABSTRACT

A process is provided for dimerizing 1-olefins which comprises contacting such olefins in a reaction zone with a minor proportion of at least one catalyst selected from the group consisting of phosphoric acid-promoted and water-promoted boron trifluoride catalyst in a mole ratio of catalyst to olefins of from about 0.005:1 to about 0.1:1 and at a temperature from about 100°C. to about 150°C.

5 Claims, No Drawings

3,742,082

DIMERIZATION OF OLEFINS WITH BORON TRIFLUORIDE

BACKGROUND OF THE INVENTION

1. Field of the Invention

This invention relates to the dimerization of olefins and relates more particularly to a controlled process for dimerizing 1-olefins with boron trifluoride catalysts. Still more particularly, in one of its aspects, the invention relates to an improved process for the manufacture of 1-olefin synthetic wide-temperature fluid lubricants by dimerization of olefin fractions employing phosphoric acid-promoted or water-promoted boron trifluoride catalysts, or mixtures of such catalysts, under controlled conditions to obtain preponderately olefin dimers suitable for use as synthetic wide-temperature fluid lubricants for many industrial applications.

2. Description of the Prior Art

As is known to those skilled in the art, boron trifluoride, per se, is a poor catalyst for polymerization of olefins, unless it is employed in conjunction with a suitable promoter. For this purpose, the prior art has suggested among other materials the use of phosphoric acid-promoted or water-promoted boron trifluoride. In this respect, such polymerization techniques have heretofore been conducted at relatively low temperatures, for example, below about 60°C., and usually from about 0°C. to about 35°C. However, reaction at these temperatures yields products unsuitable for this application. Polymerization of long-chain olefins at higher temperatures such as 100°C. is generally accompanied by undesirable reactions such as isomerization or cracking.

SUMMARY OF THE INVENTION

In accordance with the present invention, it has now been found that the dimerization of 1-olefins can be carried out without cracking and in increased product yield by employing relatively high dimerization temperatures and conducting the dimerization in the presence of phosphoric acid-promoted or water-promoted boron trifluoride catalysts, or mixtures thereof, under controlled conditions. More specifically, as hereinafter described, an improved process is provided for dimerizing 1-olefins by contacting such olefins in a reaction zone with a minor proportion of at least one catalyst selected from the group consisting of phosphoric acid-promoted and water-promoted boron trifluoride catalysts in a mole ratio of catalyst to olefins of from about 0.005:1 to about 0.1:1 and at a temperature from about 100°C. to about 150°C., and preferably at a temperature from about 100°C. to about 125°C.

In conducting the dimerization, in order to obtain relatively high yields of dimerizate product while minimizing concomitant cracking or decomposition, it is essential that the mole ratio of catalyst to olefin be maintained in the aforementioned mole ratio of from about 0.005:1 to about 0.1:1. When phosphoric acid-promoted boron tribluoride catalyst are employed, the preferred mole ratio of catalyst to olefin is about 0.005:1; when water-promoted boron trifluoride catalysts are employed, the preferred mole ratio of catalyst to olefin is about 0.01:1. The phosphoric acid boron trifluoride promoter may be prepared in several ways. For example, this promoter may be prepared by reacting 85 percent phosphoric acid and boron trifluoride at a temperature below about 50°C. with the boron trifluoride being introduced into the acid in the form of a gas. In preferred applications, this promoter contains boron trifluoride and phosphoric acid in equimolar proportions. The water boron trifluoride promoter may be prepared by simply complexing boron trifluoride in a mole ratio of about 1:1 with water. An essential feature of the process of the present invention resides in the technique of carrying out the dimerization at relatively high temperatures, low promoter concentrations, and quenching the reaction just prior to the time that cracking or decomposition can occur in order to obtain maximum yields. Conversely it is found that if dimerization temperatures below about 100°C. are employed, the degree of oligomerization is too high, resulting in a relatively high molecular weight dimer product which is too viscous for use in such applications as, for example, hydraulic fluids. Particularly desirable for many industrial applications are dimerization products of 1-olefins containing from about six to about 10 carbon atoms.

In more specific applications, it is found, in accordance with the present invention, that dimers, for example, dimers of 1-decene prepared by dimerization carried out in the presence of the aforementioned phosphoric acid-promoted or water-promoted boron trifluoride catalysts, under the above-described conditions, possess much lower pour points than the polymerization products of the same olefins, prepared by polymerization processes employing conventional di-tertiarybutyl peroxide catalysts or Ziegler catalysts, because the products obtained through the use of the latter catalysts contain relatively large amounts of high melting n-eicosane, whereas the promoted boron trifluoride products of the present invention contain none.

DESCRIPTION OF SPECIFIC EMBODIMENTS

The following examples will serve to illustrate the novel process of the present invention for conducting the dimerization of 1-olefins to yield products of improved quality.

A series of water and phosphoric acid-promoted boron trifluoride catalyzed oligomerizations of 1-decene was carried out. The individual catalysts were preformed from either water or 85 percent phosphoric acid by bubbling boron trifluoride through until one molar equivalent of the halide was absorbed. 1-decene was next introduced through the bottom of a water trap saturated with boron trifluoride and allowed to overflow into a reaction flask. The individual oligomerizations were carried out in the following manner.

The boron trifluoride saturated 1-decene and the water-boron trifluoride molar adduct were metered, by means of syringe pumps separately and simultaneously into the reaction flask. The flask was previously pressured with boron trifluoride to 2 inches of mercury and maintained at 100°C. The pump rates were 2.38 g/min. and 0.016 g/min. for decene and and promoter, respectively. The addition was completed in 63 minutes. The resulting mixture was then stirred for 15 minutes at 100°C., quenched with 100 ml of 10 percent ammonium hydroxide, water-washed until neutral and finally filtered. The resulting mixture was then analyzed by gas chromatography, as shown in the following Table I. The monomer was next removed by distillation at 50 mm pressure employing a 12-inch Vigreaux column and at a take-off rate of one drop per second. The head temperature during monomer removal varied from 80° to 105°C. Topping of 134.9 g. of the resulting mixture yielded 117.2 g. of dimer plus product. The recovered monomer may be recycled. The dimer plus product from three similar reactions were combined and hydrogenated at 350°F., 500 psig hydrogen employing 3.0 percent, by weight, of a nickel of Kieselguhr catalyst. The physical properties of the olefinic and hydrogenated dimer plus product are compared in the following Table II.

TABLE I

Water or Phosphoric Acid Promoted Boron Trifluoride Catalyzed Oligomerizations of 1-Decene

| Example | Promoter | Moles promoter 100 g. decene | Time Add | Time Hold | Temp., °C. | Conv., wt. percent | Selectivity, percent Dimer | Trimer | Tetramer plus |
|---|---|---|---|---|---|---|---|---|---|
| 1 | H₂O·BF₃ | 0.008 | 63 | 15 | 100 | 87.8 | 75.7 | 19.3 | 5.0 |
| 2 | H₃PO₄·BF₃ | 0.0036 | 51 | 60 | 120 | 89.3 | 73.3 | 20.6 | 6.1 |

TABLE II

| Dimer plus source | Kinematic viscosity, centistokes | | | |
|---|---|---|---|---|
| | 210° F. | 100° F. | −40° F. | −65° F. |
| Example 1 | 1.94 | 6.45 | 409 | 1,730 |
| Example 1 after hydrogenation | 2.01 | 7.06 | 535 | 2,407 |
| Example 2 | 1.99 | 6.73 | 451 | 2,112 |
| Example 2 after hydrogenation | 2.07 | 7.26 | | |

It will be apparent from the foregoing Tables I and II, that the dimerization of olefins employing phosphoric acid-promoted or water-promoted boron trifluoride catalysts, within a mole ratio of catalyst to olefin from about 0.005:1 to about 0.1:1 and at temperatures from about 100°C. to about 150°C., results in obtaining relatively high molecular weight olefins which are particularly suitable for use as synthetic wide-temperature fluid lubricants for many industrial applications. It will also be understood that although the process of the present invention has been described with preferred embodiments, various modifications and adaptations thereof may be resorted to without departing from the spirit and scope of the invention, as those skilled in the art will readily understand.

I claim:

1. A process for dimerizing 1-olefins having from about six to about 10 carbon atoms, which comprises contacting said olefins in a reaction zone with a minor proportion of at least one catalyst selected from the group consisting of phosphoric acid-promoted and water-promoted boron triflouride catalysts in a mole ratio of catalyst to olefins of from about 0.005:1 to about 0.1:1 and at a temperature from about 100°C. to about 150°C., removing free monomer from the dimerized olefinic product, and subjecting the monomer-free product thus obtained to hydrogenation.

2. A process in accordance with claim 1 wherein said dimerization is carried out with a phosphoric acid-promoted boron trifluoride catalyst in a mole ratio of catalyst to olefins of from about 0.005:1.

3. A process in accordance with claim 1 wherein said dimerization is carried out with a water-promoted boron trifluoride catalyst in a mole ratio of catalyst to olefin of about 0.01:1.

4. A process in accordance with claim 1 wherein said dimerization is carried out at a temperature from about 100°C. to about 125°C.

5. A process in accordance with claim 1 wherein said 1-olefins comprise 1-decene.

\* \* \* \* \*

UNITED STATES PATENT OFFICE
CERTIFICATE OF CORRECTION

Patent No. 3,742,082         Dated June 26, 1973

Inventor(s) JAMES A. BRENNAN

It is certified that error appears in the above-identified patent and that said Letters Patent are hereby corrected as shown below:

Column 1, line 58, "tribluoride" should read --trifluoride--.

Column 1, line 58, "catalyst" should read --catalysts--.

Table II, under heading '-65°F.', "1.730", "2.407", "2.112" should read --1730--, --2407--, --2112--.

Signed and sealed this 26th day of February 1974.

(SEAL)
Attest:

EDWARD M. FLETCHER, JR.          C. MARSHALL DANN
Attesting Officer                Commissioner of Patents